United States Patent [19]

Hawranik et al.

[11] Patent Number: 4,924,621
[45] Date of Patent: May 15, 1990

[54] RIG HOLDER

[76] Inventors: Gerald C. Hawranik, Box 1150; Norman Hiebert, Box 171, both of Beausejour, Manitoba, Canada, R0E 0C0

[21] Appl. No.: 347,586

[22] Filed: May 5, 1989

[51] Int. Cl.⁵ .............................................. A01K 97/06
[52] U.S. Cl. .................................................... 43/57.2
[58] Field of Search ..................... 43/54.1, 57.1, 57.2, 43/57.3

[56] References Cited

U.S. PATENT DOCUMENTS

| | | | |
|---|---|---|---|
| 2,638,699 | 5/1953 | Seeburg | 43/57.2 |
| 3,564,755 | 2/1971 | Lindgren | 43/57.2 |
| 3,940,873 | 3/1976 | Lawless | 43/57.2 |
| 4,631,856 | 12/1986 | Born | 43/57.2 |
| 4,680,886 | 7/1987 | Caselli | 43/57.1 |
| 4,691,469 | 9/1987 | Alsobrook et al. | 43/54.1 |

Primary Examiner—M. Jordan
Attorney, Agent, or Firm—Murray E. Thrift; Stanley G. Ade; Adrian D. Battison

[57] ABSTRACT

A rig holder for fishing rigs and leadered fishing lines is a flat panel of rigid material with a rectangular outline. The holder has a series of notches uniformly spaced along each of its long edges and four pairs of notches spaced along each of the short edges. On the front face of the holder is a recess carrying two strips of one component of a hook and loop pile fastener material, which are associated with patches of the other component of the fastener. Rigs may be secured to the holder in various ways, primarily by winding around the holder through opposite slots and securing the hooks in place either on the fastener strips using the fastener patches or in notches along the edges of the holder.

11 Claims, 2 Drawing Sheets

RIG HOLDER

FIELD OF THE INVENTION

The present invention relates to holders for fishing rigs and the like, including pike or pickerel rigs, snell hooks, lindy rigs, spinners, flies, crawler harnesses, little joes and flies.

BACKGROUND

In the handling of leadered fishing hooks, it is often difficult to store the rig without tangling or knotting the leader. This problem is especially acute with multi-part rigs. Various keepers and holders have been proposed in the past, but these are often limited to a single type of rig or to single lures and are frequently fairly complex in their construction. Exemplary prior art devices are described in the following:

U.S. Pat. No. 1,397,790 issued Nov. 22, 1921 to F. W. Tegner describes a tackle holder consisting of a flat spool with hook receiving notches and a groove or spaced holes along one edge. This device is used for lines with snell hooks.

U.S. Pat. No. 3,619,933 issued Nov. 16. 1971 to I. W. Couch describes a "trot line" keeper in the shape of a fish. The main line is wound around the body of the fish, while the snell hooks are engaged over the tail fin. The tail is slideable on the body so that the snell lines may be maintained taut.

U.S. Pat. No. 4,514,928 issued May 7, 1985 1985 to C. A. Hanson teaches a leader holder in the form of a rigid block with winding slots and an array of elastic bands for tensioning and retaining the leaders wound into the winding slots.

U.S. Pat. No. 4,680,886 issued Jul. 21,. 1987 to J. M. Caselli, Sr. describes a holder for leadered fish lures. It is an elongate block with various notches and holes for retaining a single lure.

The objective of the present invention is to provide a simple device that is capable of holding a wide variety of rigs, leadered hooks and the like.

SUMMARY

According to the present invention there is provided a holder for fishing rigs and the like comprising a substantially flat panel of rigid material having a rectangular outline and notches spaced along each edge of the panel.

With a holder so configured, the main line of a rig can be wound around the panel from end to end, and the other parts of the rig can be individually wound onto the holder and the hooks held in place, either by engagement in notches along an edge of the panel or with a releasable hook and loop pile fastener such as that sold under the trade mark "Velcro" on the face of the panel.

BRIEF DESCRIPTION OF THE DRAWINGS

In the accompanying drawings which illustrate an exemplary embodiment of the present invention.

DETAILED DESCRIPTION

Figure 1:
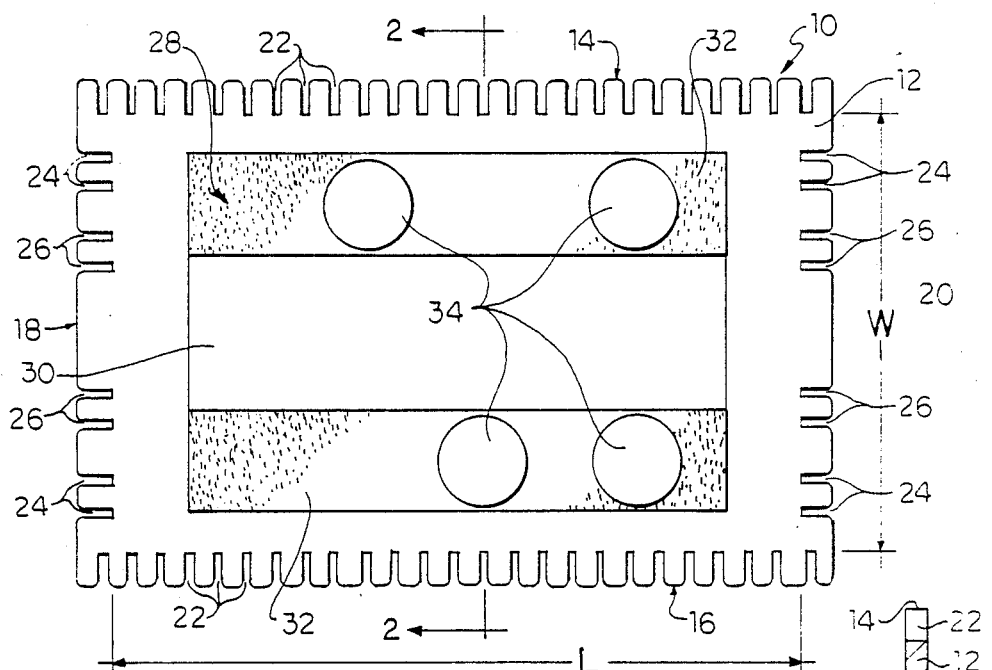
FIG. 1 is a plan view of an embodiment of the rig holder.
Figure 2:
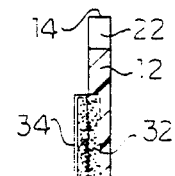
FIG. 2 is a sectional along line II—II of FIG. 1.

Referring to the drawings, and most particularly to FIGS. 1 and 2, there is illustrated a holder 10 that consists of a flat panel 12 of rigid plastic material. The panel is rectangular in its overall shape with parallel long sides 14 and 16 and parallel short sides 18 and 20. A series of notches 22 is formed in each of the long sides of the panel. The notches 22 are spaced apart by a distance less than 3/16". In the preferred embodiment the notches are spaced apart by approximately 5/32" and each notch has a width of approximately 1/16". There are twenty-four notches along each long side.

In each shorter side of the panel are four pairs of notches, two outer pairs 24 and two inner pairs 26. The notches in each pair are spaced less than 3/16", preferably 5/32", and each notch has a width of 1/16". The outer notch of each outer pair is spaced in from the adjacent long edge of the panel by a distance of ¼", while adjacent outer and inner pairs of notches are spaced apart by 5/16".

The length L of the holder, between the roots of the opposite notches is 5⅛", while the width W between the roots of opposite notches is 3¼". Each notch has a depth of ¼".

The panel 12 has a recessed centre rectangular area 28. The recess is stepped, with the centre strip 30 being shallower than the remainder of the recess. On either side of the centre strip are two strips 32 of the hook component of a two component hook and loop panel fastener such as the material sold under the trade mark "Velcro". Associated with the fastener strips 32 are circular fastener patches 34 that are made from the other component of the fastener material.

Figure 3:
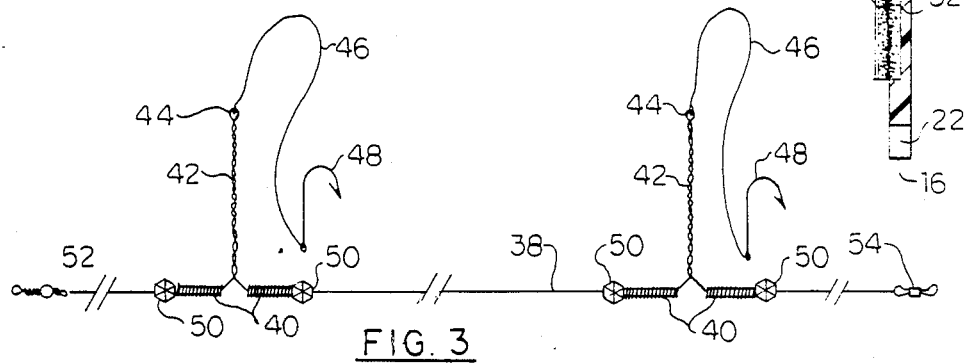
FIG. 3 illustrates a pickerel rig.

FIG. 3 illustrates a pickerel rig of known form. This consists of a main line 38 carrying two hook assemblies. Each assembly consists of two wire coils 40 through which the main line 38 passes and a twisted wire arm 42 projecting laterally from the coils to an eye 44 at the outer end. A leader 46 is connected to the eye 44 and carries a hook 48 as its outermost end. The assembly is retained in place on the main line with a pair of beads 50. At one end of the main line is a swivel 52 and at the other a snap hook 54.

Figure 4:
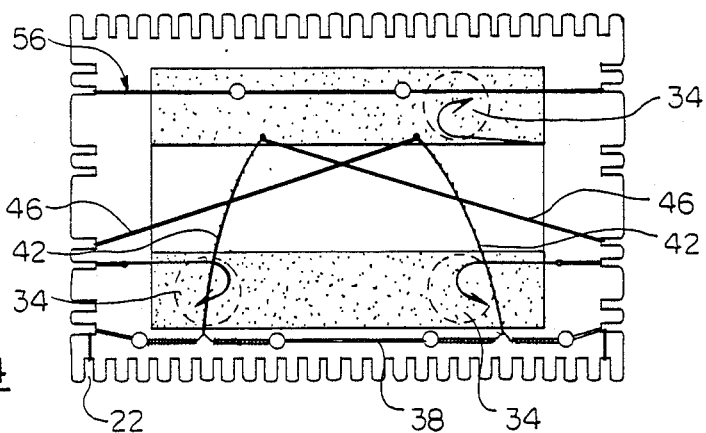
FIG. 4 illustrates the holder carrying the pickerel rig of FIG. 3 and a lindy rig.

The pickerel rig is secured to the rig holder as illustrated in FIG. 4. One end of the main line is placed into one of the notches 22 on a long side of the holder. The main line 38 is then wound lengthwise into the notches provided in the short sides of the holder. The remaining end of the rig is then slipped into a notch on the long side. The leads are then wound lengthwise and the hooks secured in place on the fastener strips with the patches 34.

FIG. 4 also illustrates a lindy rig 56 carried on the holder. To mount this type of rig, the swivel end is placed into an end notch, the rig is wound lengthwise and the hook secured in place with a fastener patch 34 or, where desired, in one of the notches on the long side of the holder. Snell hooks are likewise easily mounted by winding the main line onto the rig using the end notches and securing the hooks either with the fastener material or in the notches along the long sides of the holder.

Figure 5:
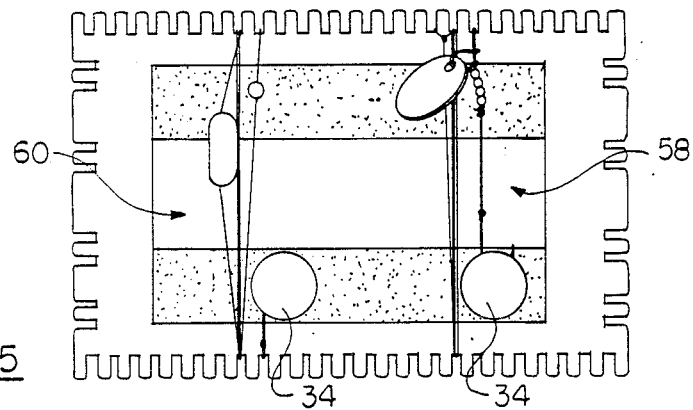
FIG. 5 illustrates the holder carrying two alternative types of tackle.

FIG. 5 illustrates an alternative use of the holder, where two rigs are wound around the holder through notches in the long sides. In this case, one of the rigs is a spinner 58 and the other is a modified lindy rig 60. In both cases, the hooks are held in place with the fastener patches 34 on fastener strips 32.

Figure 6:
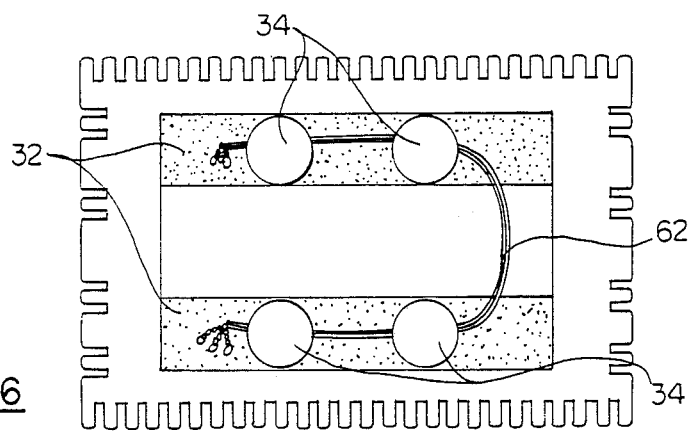
FIG. 6 illustrates the holder carrying a number of steel leaders.

FIG. 6 illustrates the use of the holder for carrying a series of steel leaders 62. The leaders are bent into a U-shape and held down on the fastener strips 32 with fastener patches 34.

A rig holder according to the present invention is for practical purposes universal in its application. Because of the arrangement of notches and fastener strips, a line end can be secured, the line wound and hooks secured without tangling any component of the rig, regardless of the rig's length. The dimensions given in the foregoing are especially preferred because it has been found that those dimensions suit the rig holder for carrying the various pickerel rigs now available.

While one particular embodiment of the invention has been described in the foregoing, it is to be understood that the invention is not limited to that one embodiment. The scope of the invention is to be determined solely by reference to the appended claims.

I claim:

1. A holder for fishing rigs and the like comprising a substantially flat panel of rigid material having a rectangular outline, notches spaced along each edge of the panel, a recess in a front face of the panel, two strips of one component of a two component hook and loop pile fastener secured to the front face of the panel in the recess and a plurality of patches of the other component of the fastener.

2. A holder according to claim 1 wherein the recess is stepped, having a central shallow section between the fastener strips.

3. A holder according to claim 2 wherein the notches are spaced uniformly along longer edges of the panel.

4. A holder according to claim 3 wherein pairs of notches are spaced along the shorter edges of the panel.

5. A holder according to claim 4 wherein each notch is spaced from at least one adjacent notch by less than 3/16".

6. A holder according to claim 5 wherein each notch is spaced from at least one adjacent notch by approximately 5/32".

7. A holder according to claim 6 wherein each notch has a width of approximately 1/16".

8. A holder according to claim 7 including 24 notches spaced along each long side of the panel.

9. A holder according to claim 8 including four pairs of notches spaced along each short side of the panel.

10. A holder according to claim 9 wherein the panel has a length between the roots of opposite notches of substantially 5⅛".

11. A holder according to claim 10 wherein the panel has a width between the roots of opposite notches of substantially 3¼".

* * * * *